March 1, 1927.                                                                                    1,619,733
                            G. N. JEPPSON
                       AGGREGATE CEMENT TILE
                       Filed Nov. 28, 1922
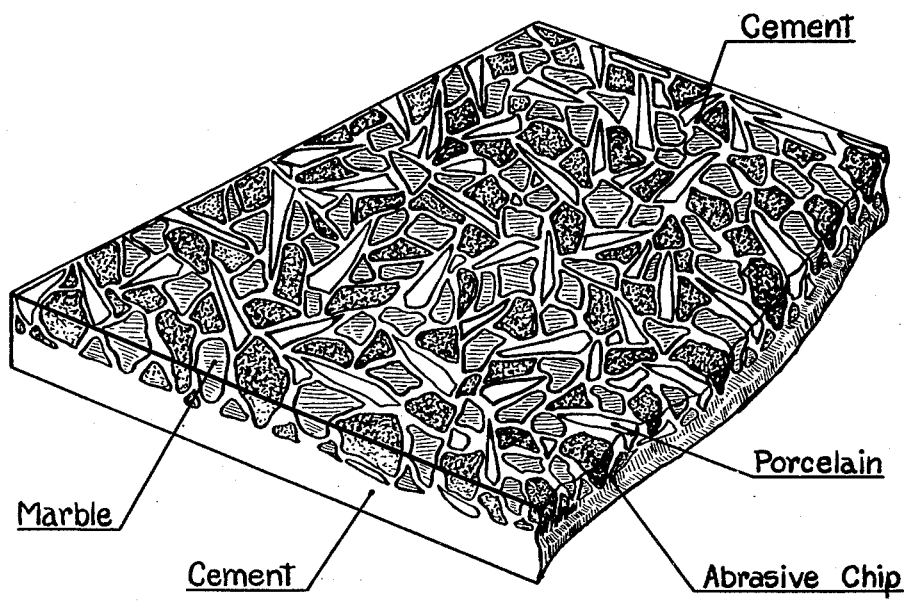

Patented Mar. 1, 1927.

1,619,733

UNITED STATES PATENT OFFICE.

GEORGE N. JEPPSON, OF WORCESTER, MASSACHUSETTS, ASSIGNOR TO NORTON COMPANY, OF WORCESTER, MASSACHUSETTS, A CORPORATION OF MASSACHUSETTS.

AGGREGATE-CEMENT TILE.

Application filed November 28, 1922. Serial No. 603,805.

This invention relates to architectural surfacings and more particularly to an aggregate cement tile, which is serviceable in various industries but especially for use as a floor and a wall surfacing.

Heretofore it has been customary to lay a terrazzo floor by embedding marble chips in a plastic concrete surface and then, after the concrete has set, grinding the floor to a substantially plane surface. It has been found that such marble surfaced floors are very slippery and that under severe conditions of usage the marble, being a relatively soft material, wears away rapidly and soon leaves the soft concrete beneath exposed to destructive abrasions.

It has also been proposed to make a safety tread of a cement body having abrasive aggregates interspersed throughout its surface. Such treads have not been wholly satisfactory for use on interior floors where decorative effects and cleanliness are essential, due partly to their porosity and absorptive characteristics which rendered them difficult to keep clean and free from stains.

It is one object of my invention to provide a tile which will be highly wear-resistant and have a long life under severe pedestrian usage, which will have a dense and substantially non-absorbent surface made of variegated colored chips interspersed with antislipping aggregates whose distribution is such that the tile will wear substantially uniformly and which is so constructed as to present an attractive surfacing capable of use as a safety tread in elaborate architectural settings and in conjunction with interior or exterior decorations of the finer types. Further objects will be apparent in the following disclosure.

Referring to the drawing, I have there shown a perspective view, partly broken away, of a tile embodying my invention, which is adapted to be laid in desired patterns and arrangements as a surfacing.

In accordance with this invention, I propose to form a dense non-absorbent tile by mixing anti-slipping aggregate containing abrasive granules with decorative chips of suitable materials and embed these in desired arrangements in the surface of a plastic setting medium, such as concrete. Preferably, the aggregates and decorative chips are washed and mixed with a plastic setting medium, such as a dry cement, and water and then shaped in a mold as a dense compact mass by jarring the mold by abrupt movements vertically. This causes the chips and aggregates to be closely disposed and arranged with their flat faces in the tile surface, and these are surrounded by a dense mass of cement which, when set, has a lower porosity and water absorptive power than is possessed ordinarily by cement. Of the various decorative bodies available for my purposes, I preferably employ chips of porcelain and the like vitrified ceramic materials, suitably colored and combined in desired decorative combinations and schemes, but I may substitute chips of colored marbles, granite and other available surfacing materials for a portion, or the whole of the porcelain chips in order to vary the color scheme and produce pleasing designs. In order that a flooring or other surfacing may be laid in position expeditiously and economically, I propose to preform these tiles in accordance with my invention in suitable geometrical designs, shapes and sizes and to finish the outer surface of these tiles individually and thereafter to lay the tiles on a suitable foundation by ordinary masonry methods.

A desirable type of floor tile may be made of porcelanic chips of variegated colors and shapes interspersed in a concrete surface with anti-slipping aggregates of crystalline alumina granules bonded by a vitrified ceramic material and with sufficient stone chips to give a desired color scheme. The relative amounts of the various types of chips are not important except that sufficient antislipping chips should be employed and so uniformly distributed throughout the tread surface that these receive substantially all of the pedestrian wear and thereby protect the smooth marble, porcelain and cement portions of the surface. In order that the tile may present a pleasing appearance and be in harmony with its architectural surroundings, I preferably so treat the surface materials as to emphasize the color scheme and this is done preferably by grinding and polishing the surface and treating it with polishing and preserving materials.

As a satisfactory anti-slipping aggregate for this purpose, I preferably utilize abrasive materials which have a hardness of 9 or more on Mohs' scale, and preferably crystalline alumina, either as prepared artificially or as found in nature, such as corundum, emery, or electrically fused alumina, but I may utilize silicon carbide which is harder, or abrasive materials which have a lesser degree of hardness than 9. Grain sizes smaller than 16 meshes to the linear inch and preferably 60 and finer are ordinarily chosen. In order to bond such anti-slipping grains into durable chips, I ordinarily utilize a ceramic bond and one which preferably may be fused to a vitreous condition in a ceramic kiln. A serviceable mixture may comprise the following ingredients:

|  | Parts by weight. |
|---|---|
| Slip clay | 44 |
| Feldspar | 44 |
| Ball clay | 12 |

These proportions may obviously be varied and other materials added or substituted for the ingredients mentioned, depending upon the bond characteristics desired, as is known to one skilled in this art. The bond may be mixed in suitable proportions with crystalline alumina granules of, say #60 grit size, such as 77% by weight of alumina and 23% of bond. These materials may be mixed in dry condition and then dampened with water sufficient to form it by the dry press method into lumps or shapes of convenient size for handling and firing. The shapes are burned in a suitable ceramic kiln under a heat treatment corresponding with Seger cone 12 after which the vitrified product is removed and crushed to desired lump sizes which ordinarily grade from 1/8 inch to 1 inch in size. The porosity depends upon the size of grain and the amount and type of bond used. I preferably employ a chip which has a porosity of at least 5%, such as one made in accordance with the proportions above specified.

The marble chips are selected and graded according to the purposes desired and preferably are sized to correspond with the abrasive aggregate. Since marble is relatively soft and does not have high resistance to severe traffic wear, I find it expedient to employ porcelain chips in many types of flooring, such as where it is not advisable or necessary to use a high percentage of the anti-slipping chips and yet the floor must have a long life, or where the artistic features demand the use of porcelain chips either because of a desired color scheme or because of the peculiar sliver-like shapes which porcelains may break into. The porcelain chips or slivers may be obtained by suitably crushing old porcelain ware but may if desired be made initially by approved methods. I may, for example, employ a ceramic mixture of the following ingredients in the proportions specified:

|  | Parts by weight. |
|---|---|
| Ball clay | 35 |
| Feldspar | 25 |
| Flint | 40 |

These materials after being suitably molded, dried and burned to vitrify the mixture, are crushed to desired sizes and are ready for use. If colored porcelains are desired, suitable coloring material may be incorporated in the porcelanic composition, such as chromium oxide for producing a light green colored chip.

As one method of manufacturing a satisfactory tile in accordance with this invention, the anti-slipping aggregate and the marble or porcelain chips are first washed with water to clean them and to fill their pores with water before the cement is applied, and they are then mixed in suitable proportions such as 40% of aggregate to 60% of chips, and to 100 parts of this mixture are added 50 parts by weight of Portland cement. Water is added and the mass mixed after which it is poured into a suitable mold of the desired thickness, which is preferably 5/8 of an inch. This mixture in its mold is jolted in a suitable jolting machine for a few minutes which imparts successive quick abrupt movements to the mold in order to compact the mass and increase its density. A backing of two parts of sand and one part of cement is then added to the mold after which the mass is set away in the mold to dry for a day's time. The tile is then removed from the mold and immersed in water for several days after which it is finally dried out and allowed to harden.

The tile which as thus made presents a rough and unattractice surface is then rubbed on a rubbing bed with suitable abrasive grains or grinding blocks until the aggregates and chips have been provided with large plane surfaces which show to the best advantage. If blow holes are found, a further coating of cement may be added. Then the tile is given a final rubbing and is polished to bring out the color scheme with such materials as pumice and oxalic acid and then coated and rubbed with a thin mixture of a preservative such as turpentine and bees wax. If a light colored marble or porcelain is used, the tile may be left in the original state after it has been sufficiently rubbed.

In accordance with this invention, I provide a tile which contains a large percentage of abrasive anti-slipping aggregates which may be highly porous and yet which due to the peculiar method of treatment employed is substantially non-absorbent of water. Hence such a floor will be satisfactory under normal conditions of use and not show permanent water and dirt stains on it where the floor may become wet or liable to have mud tracked on it. The abrasive anti-slipping aggregate, being in a considerable amount and preferably forming the major portion of the tile surface, receives the traffic wear and so protects the softer adjacent portions. If a large percentage of porcelain chips are employed, the wearing down of the surface is quite uniform due to the fact that both the porcelain chip and the bond of the crystalline alumina aggregate have substantially the same hardness. It is to be understood that the projecting grains of abrasive serve not only as anti-slipping elements but to reduce the possibility of frictional action on the porcelain chips and bond, thus greatly prolonging the life of the tile over that of an ordinary porcelain, marble or cement tile.

I claim:

A tile comprising a precast cement body having embedded in its top surface aggregates of ceramic bonded abrasive grains interspersed with colored chips of vitrified ceramic material which are so arranged with the surrounding areas of cement that the aggregates will contact with and prevent foot gear from slipping thereon, the tile being dense and substantially non-absorbent of water and having a ground and polished surface made up largely of the aggregates and the ceramic chips which are adapted to receive substantially all of the wear and protect the surrounding cement.

Signed at Worcester, Massachusetts, this 18th day of Nov., 1922.

GEORGE N. JEPPSON.